United States Patent [19]

Sato

[11] Patent Number: 4,580,549
[45] Date of Patent: Apr. 8, 1986

[54] FRYER

[75] Inventor: Tadayoshi Sato, Tokyo, Japan

[73] Assignee: Ricoh Kiki Co., Ltd., Japan

[21] Appl. No.: 683,369

[22] Filed: Dec. 19, 1984

[30] Foreign Application Priority Data

Dec. 28, 1983 [JP] Japan ................... 58-249990

[51] Int. Cl.4 ............................................. F24D 1/00
[52] U.S. Cl. ................................. 126/391; 99/408;
126/350 R; 99/316; 99/415
[58] Field of Search ............ 126/391, 350 R; 99/403,
99/408; 219/316, 319, 315, 415

[56] References Cited

U.S. PATENT DOCUMENTS 2,535,905  12/1950  Dawson ..................... 99/408

FOREIGN PATENT DOCUMENTS 45-29261  11/1970  Japan .
8001007   9/1981  Netherlands ............... 99/408

Primary Examiner—Randall L. Green
Attorney, Agent, or Firm—Lucas & Just

[57] ABSTRACT

A fryer is provided in which both frying oil and water are placed in a frying vessel, forming an oil bath in the upper portion of the vessel and a water bath in the lower portion due to the difference in specific gravity between oil and water. A heat source such as gas, a heater or the like is provided in the oil bath while air intake pipes are provided near the boundary between oil and water, and bits of which fall in the oil bath are caused to settle down into the water bath to prevent oxidation of the frying oil, thereby enabling longer use of the frying oil and insuring good frying conditions.

1 Claim, 5 Drawing Figures

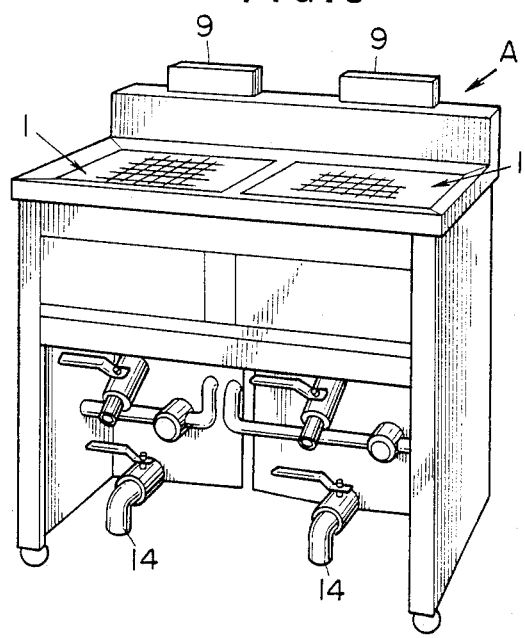
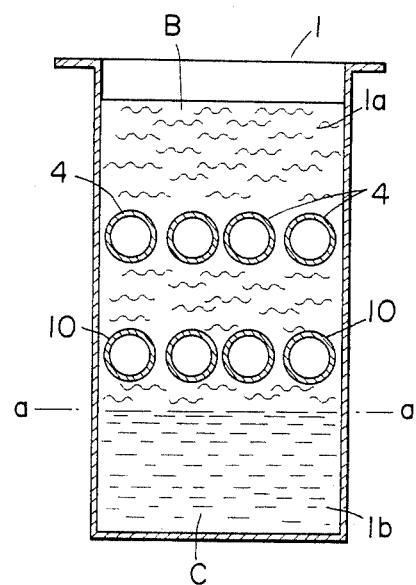
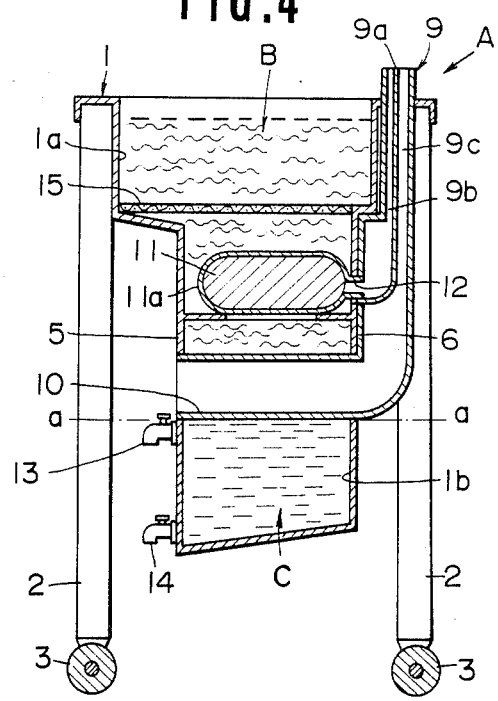

FRYER

BACKGROUND OF THE INVENTION

It is the ordinary method of frying with conventional fryers to heat frying oil in a fryer and put the material to be fried into the oil after the oil has been heated to a suitable temperature for frying. In this method of frying, however, the temperature of the oil decreases as the material to be fried is put into the oil, and further, the oil is gradually oxidized due to the accumulation in the oil of bits of deep-fried batter, making the oil unable to perform frying in the desired way.

The present invention has been achieved through many and various experiments for frying material always in a desired way by eliminating said problems with the conventional fryers, and the invention provides a fryer free of said problems and capable of frying material always in an excellent way.

SUMMARY OF THE INVENTION

The fryer according to this invention comprises a frying vessel in which frying oil and water are placed, allowing the oil to rise above the water due to the difference in specific gravity between oil and water, and bits of fried batter formed in frying operation are caused to settle down in the water. Said frying vessel is also so designed that the area near the boundary between frying oil and water is cooled to inhibit said bits of batter from floating up into the oil thereby preventing oxidation of the oil by such bits of batter, thus allowing longer use of oil and always insuring the best mode of frying.

BRIEF DESCRIPTION OF THE DRAWINGS

FIG. 3 is a perspective view of the fryer with two oil baths.

FIG. 4 is a vertical cross-sectional view of the fryer as it was adapted with a heater.

FIG. 5 is vertical cross-sectional view taken along the line V—V of FIG. 2.

DESCRIPTION OF THE EMBODIMENTS

Figure 1:
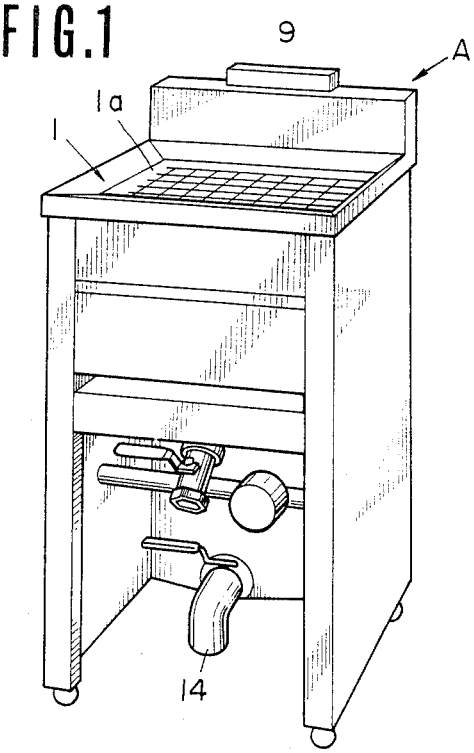
FIG. 1 is a perspective view of the fryer with a single oil bath.
Figure 2:
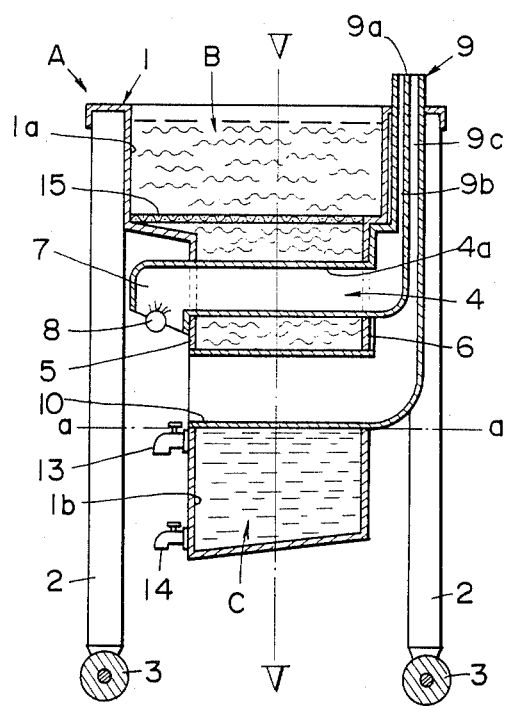
FIG. 2 is a vertical cross-sectional view thereof.

The present invention relates to an improved fryer, and the object of the invention is to enable longer use of the frying oil and uniform high-quality frying. This can be achieved by the fryer of this invention in which frying oil, water and air are used in proper combination. Frying oil and water are placed in a frying vessel, allowing the oil to rise above the water due to the difference in specific gravity between them, so that an oil bath is formed at the upper portion of the vessel and a water bath at the lower portion, and bits of fried tempura batter formed in frying operation are caused to settle down in the water bath, said bits being inhibited from floating up into the oil bath to prevent oxidation of the frying oil by such bits.

The invention will be described below by way of its preferred embodiments with reference to the accompanying drawings.

Referring to the drawings, A designates the fryer in accordance with this invention. The fryer A comprises a deep frying vessel 1 in which the upper portion contains frying oil B, forming an oil bath 1a, and the lower portion contains water C, forming a water bath 1b.

When frying oil and water are placed in the vessel 1, the oil floats upon water due to the difference in specific gravity, and thus the interior of the vessel 1 is naturally compartment into the upper oil bath 1a and the lower water bath 1b. The frying vessel 1 is supported in a suspended manner by a frame 2 to constitute the frying A. When the fryer A is large, the frame 2 is fixed. On a small fryer, the frame 2 is designed to be movable by mounting small wheels or rollers 3 at the bottom of the frame. A heating means 4 is provided extending through front and rear side walls 5, 6, near the boundary between oil bath 1a and water bath 1b. When using gas as fuel, pipes of the same diameter are laid juxtaposed equidistant from each other. A gas combustion chamber 7 is provided at the opening of each heating pipe 4a. A gas burner 8 is set for each of the heating pipes 4a, the rear end of each heating pipe 4a being connected into a stack 9 so that the flames of burner 8 will be guided toward the stack 9 from combustion chamber 7 through heating pipe 4a to heat said heating pipe 4a, thereby heating the oil in oil bath 1a. The temperature of heating pipes 4a can be controlled independently of each other since a burner 8 capable of adjusting temperature with a temperature control is provided for each heating pipe 4a. Also, air intake pipes 10 are provided laterally spaced equidistant from each other, said air intake pipes 10 being disposed below said heating pipes 4a and extending through front and rear side walls 5, 6 of the vessel 1 like heating pipes 4a. Said air intake pipes 10 are juxtaposed to each other and in staggered relation to heating pipes 4a so that each air intake pipe 10 is positioned substantially at the halfway point in the interval between each of the adjoining heating pipes 4a. The rear end of each said air intake pipe 10 is connected into the stack 9, the interior of which is sectioned by a partition plate 9a into two portions 9b and 9c, said air intake pipe 10 being connected into the portion 9c so that air in said pipe 10 is released into the atmosphere through said stack 9 separately from the discharge from each said heating pipe 4a. Such division between the heat discharging passage 9b connecting to heat source 4 and the air discharging passage 9c connecting to air intake pipes 10 is intended to allow non-interfering discharge of heat and air and to cool the heat discharging passage 9b with the air discharging passage 9c to prevent over heating of said heat discharging passage 9b, thereby preventing abnormal temperature rise and eliminating the risk of fire at the site of use of the fryer. This arrangement also has the advantage that the two passages work interdependently of each other, that is, one passage with stronger discharging action helps to promote discharge through the other passage with weaker discharging action, thus improving overall performance. Outer air is sucked into each air intake pipe 10 and the sucked-in air serves as a heat absorber while passing through said pipe 10 to cool it. Also, the design of each heating pipe 4a prevents excess heating of water in the water bath 1b while also preventing elevation of temperature of the oil near the boundary a between oil bath 1a and water bath 1b. When using a heater 11 as heat source as shown in FIG. 4, such heater 11 is housed in a hermetically sealed case 11a provided with a duct 12 opening into the stack 9. The heater 11 is designed to be circular or oval in sectional shape so that a high-temperature will be generated on the side exposed to oil bath 1a while generating no heat on the side exposed to water bath 1b. This heater 11 is of course adapted with a thermostat to allow control of heating temperature.

Usually the optimal temperature for frying is around 180° C. to 190° C. Some types of material to be fried, such as vegetable, fish, etc., contain a slight amount of water as they are washed with water before fried, so that when such material is put into the heated frying oil, the oil temperature decreases temporarily. However, since the heat discharging passage 9b is so arranged that its portion closer to the discharging end is cooled to a greater degree by the air intake passage 9c and therefore lower in discharge rate, the optimal temperature for frying is soon recovered due to this arrangement plus proper control of the fire. In the drawings, numeral 13 indicates a water level cock (oil drain cock) adapted for maintaining the interface boundary between oil and water, 14 a water drain cock, and 15 a net.

As described above, according to the fryer of this invention, frying oil and water are contained in a same vessel and an oil bath is formed in the upper part of the vessel while forming a water bath in the lower part by making use of the difference in specific gravity between oil and water, and in use of the fryer, the bits of fried batter are caused to settle down in the water bath to prevent oxidation of oil, enabling long-time use of oil to realize a substantial economization thereof. Further, air intake pipes are provided besides the oil heating pipes to prevent excess heating of oil due to long-time use of the oil bath by utilizing air. Thus, the present invention provides a fryer having splendid economic advantages by embodying the new idea of utilizing natural water and air for overcoming the defects of conventional fryers. What is claimed is:

1. A fryer comprising a deep frying vessel in which frying oil and water are places, causing natural formation of an oil bath at the upper part of the vessel and a water bath at the lower part due to the difference in specific gravity between oil and water, in which
   a heat source is provided in the oil bath above where air intake pipes extend through said vessel and are provided at a section where the oil and water boundary is located and outer air is passed through said air intake pipes to prevent overheating of oil at the oil-water boundary,
   a vertical exhaust stack, vertically divided into a first exhaust port serving as the exhaust port for said heating source and a second exhaust port serving as an exhaust port for said air intake pipes such that said first exhaust port heats the air in said second exhaust port causing outer air to be drawn through said air intake pipes and such that said second exhaust pipe cools a gas in said first exhaust pipe,
   and in practice of frying with the fryer, the bits of fried batter are caused to settle down into the water bath owing to said arrangement to prevent oxidation of the oil to enable longer use of the frying oil and to insure good frying conditions.

* * * * *

UNITED STATES PATENT AND TRADEMARK OFFICE
CERTIFICATE OF CORRECTION

PATENT NO. : 4,580,549

DATED : April 8, 1986

INVENTOR(S) : Tadayoshi Sato

It is certified that error appears in the above-identified patent and that said Letters Patent is hereby corrected as shown below:

Claim 1, line 2, change "places" to --placed--.

Signed and Sealed this

Sixteenth Day of September 1986

[SEAL]

Attest:

Attesting Officer

DONALD J. QUIGG

Commissioner of Patents and Trademarks